(No Model.)

H. LINDENBERG.
HAND SLED.

No. 353,262. Patented Nov. 23, 1886.

WITNESSES:
John H. Reemer
C. Sedgwick

INVENTOR:
H. Lindenberg
BY Munn & Co
ATTORNEYS.

UNITED STATES PATENT OFFICE.

HERMAN LINDENBERG, OF JERSEY CITY, NEW JERSEY.

HAND-SLED.

SPECIFICATION forming part of Letters Patent No. 353,262, dated November 23, 1886.

Application filed April 3, 1886. Serial No. 197,617. (No model.)

*To all whom it may concern:*

Be it known that I, HERMAN LINDENBERG, of Jersey City, in the county of Hudson and State of New Jersey, have invented a new and Improved Hand-Sled, of which the following is a full, clear, and exact description.

The object of my invention is to provide a practical self-propelling hand-sled.

The improved sled is designed more particularly for ice; and the invention consists, principally, in providing the sled with a sliding bar having penetrating-points for forcing the sled forward as the rider draws backward upon handles attached to the sliding bar.

The invention also consists in the special construction of the sled, all as hereinafter described and claimed.

Reference is to be had to the accompanying drawings, forming a part of this specification, in which similar letters of reference indicate corresponding parts in all the figures.

Figure 1:
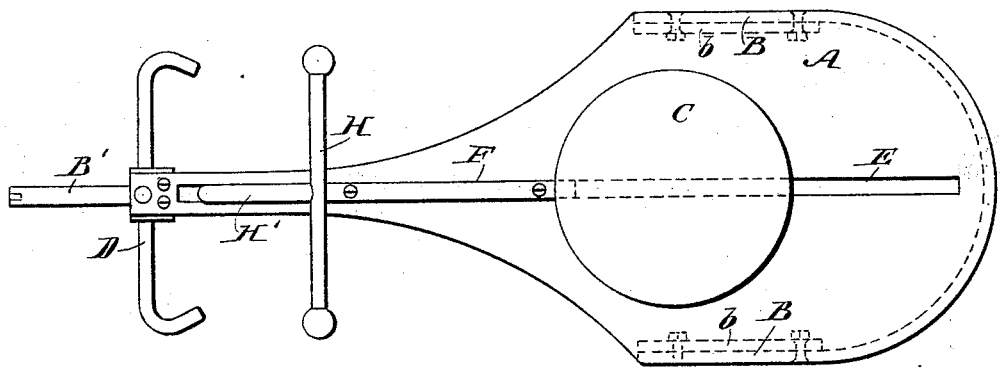
Figure 2:
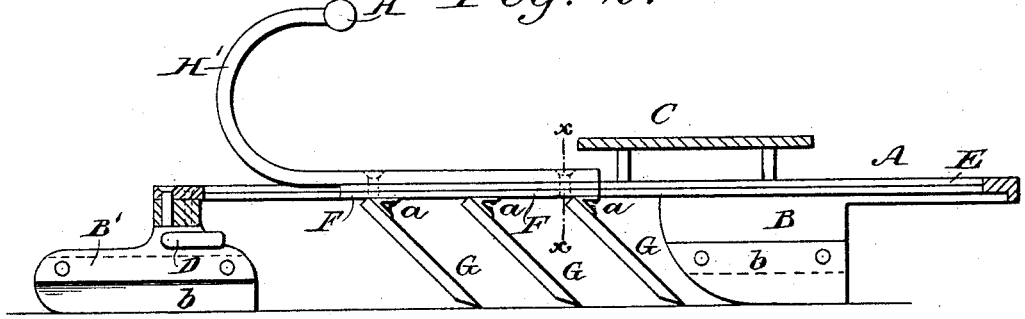

Figure 1 is a plan view of my new and improved sled. Fig. 2 is a longitudinal sectional elevation of the same, and Fig. 3 is a transverse sectional elevation taken on the line $x\ x$ of Fig. 2.

A represents the body of the sled supported upon the two rear stationary runners, B B, and the front runner, B', which is pivoted to turn in either direction for guiding the sled. Rising from the body A is the seat C, on which the rider sits and places his feet against the cross-piece D, attached to the front runner, B', so he may steer the sled by turning the cross-piece to the right or left.

Figure 3:
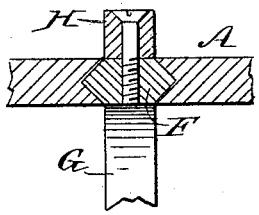

The body A is made in two parts or centrally slotted, as shown at E, and the edges of the slot are, by preference, dovetailed, as shown in Fig. 3, and in the slot E is placed the dovetailed bar F, which is adapted to slide freely in the groove. To the under surface of the bar F are attached the penetrating-points G, which are inclined backward, and are adapted to enter the snow or ice for enabling the rider to force the sled forward. The points G are attached to the bar F by the spring-hinges $a\ a$, so they will not interfere with the forward movement of the sled, and yet be held in contact with the snow or ice; and to the upper surface of the bar F is secured—in this instance by the bow H'—the cross piece or handle H, by which the rider, sitting on the seat C, may conveniently draw upon the bar F for forcing the sled forward.

The runners B B' may be plain ordinary runners; but for ice I prefer to provide them with plates $b$, of steel or other metal, held in place by bolts, to run upon the edge, so there will be as little friction as possible, and so by removing the bolts the plates $b$ may be removed for sharpening.

Having thus fully described my invention, I claim as new and desire to secure by Letters Patent—

1. The combination, with a hand-sled, of a sliding bar having penetrating-points and a handle by which the rider may propel the sled, substantially as described.

2. The body A of the sled, formed with a slot, E, in combination with the sliding bar F, placed in the slot and provided with the penetrating-points G, and handle H, substantially as and for the purposes set forth.

3. The bar F, provided upon its under surface with the inclined points G, hinged to the bar and provided at its upper surface with the handle H, in combination with the body A, formed with the slot E, to receive the bar F, substantially as and for the purposes set forth.

4. The body A, provided with rear fixed runners, and with a front pivoted runner provided with a foot-piece, D, in combination with the sliding propelling-bar F, provided with penetrating-points, substantially as and for the purposes set forth.

5. The body A, slotted as shown at E, and provided with the elevated seat C, in combination with the sliding bar F, provided with points G, substantially as and for the purposes set forth.

HERMAN LINDENBERG.

Witnesses:
H. A. WEST,
HERMANN BENNECKE.